US010728540B2

(12) United States Patent
Hur et al.

(10) Patent No.: US 10,728,540 B2
(45) Date of Patent: Jul. 28, 2020

(54) DISPLAY APPARATUS, METHOD OF CONTROLLING THE SAME AND RECORDING MEDIUM THEREOF

(71) Applicant: SAMSUNG ELECTRONICS CO., LTD., Suwon-si (KR)

(72) Inventors: Jaemyung Hur, Suwon-si (KR); Kwanyoung Kim, Suwon-si (KR); Seungil Yoon, Suwon-si (KR); Dongwook Kim, Suwon-si (KR); Jungseop Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/571,883

(22) Filed: Sep. 16, 2019

(65) Prior Publication Data

US 2020/0092541 A1 Mar. 19, 2020

(30) Foreign Application Priority Data

Sep. 17, 2018 (KR) .................. 10-2018-0110940

(51) Int. Cl.
*H04N 17/00* (2006.01)
*G06F 3/147* (2006.01)
(Continued)

(52) U.S. Cl.
CPC .......... *H04N 17/004* (2013.01); *G06F 3/147* (2013.01); *H04N 5/40* (2013.01); *H04N 5/4401* (2013.01); *H04N 17/04* (2013.01)

(58) Field of Classification Search
CPC ...... H04N 17/004; H04N 5/40; H04N 5/4401; H04N 17/04; G06F 3/147
(Continued)

(56) References Cited

U.S. PATENT DOCUMENTS 8,860,885 B2   10/2014  Choi
2003/0128675 A1*   7/2003  Kuo .................. H04L 27/04
370/328

(Continued)

FOREIGN PATENT DOCUMENTS

EP   2 552 068 B1   2/2014

OTHER PUBLICATIONS

International Search Report (PCT/ISA/210) and Written Opinion (PCT/ISA/237) dated Jan. 10, 2020, issued by the International Searching Authority in International Application PCT/KR2019/011755.

*Primary Examiner* — Michael Lee
(74) *Attorney, Agent, or Firm* — Sughrue Mion, PLLC

(57) ABSTRACT

A display apparatus includes: a display configured to display an image; a first transmitter configured to transmit a first wireless signal to an external device; a second transmitter configured to transmit a second wireless signal having a same period as the first wireless signal transmitted by the first transmitter to the external device; a signal receiver configured to receive the first wireless signal and the second wireless signal; and a processor configured to identify a time difference between the signal receiver receiving the first wireless signal and the signal receiver receiving the second wireless signal, and control the first transmitter to transmit, to the external device, the first wireless signal that is compensated based on the identified time difference, or control the second transmitter to transmit, to the external device, the second wireless signal that is compensated based on the identified time difference.

20 Claims, 6 Drawing Sheets

(51) Int. Cl.
  *H04N 17/04* (2006.01)
  *H04N 5/44* (2011.01)
  *H04N 5/40* (2006.01)

(58) Field of Classification Search
  USPC .......................................................... 348/192
  See application file for complete search history.

(56) References Cited

U.S. PATENT DOCUMENTS

| | | | |
|---|---|---|---|
| 2008/0037680 A1* | 2/2008 | Sakata | H04B 7/0613 |
| | | | 375/267 |
| 2009/0186582 A1 | 7/2009 | Muhammad et al. | |
| 2013/0209096 A1* | 8/2013 | Le Pallec | H04J 3/0667 |
| | | | 398/35 |
| 2014/0369225 A1 | 12/2014 | Burchard | |
| 2015/0195428 A1* | 7/2015 | Lee | H04N 5/05 |
| | | | 348/515 |
| 2015/0277621 A1 | 10/2015 | Roberson et al. | |
| 2017/0302431 A1* | 10/2017 | Lugthart | H04L 7/033 |
| 2018/0153411 A1 | 6/2018 | Amir et al. | |

* cited by examiner

FIG. 1
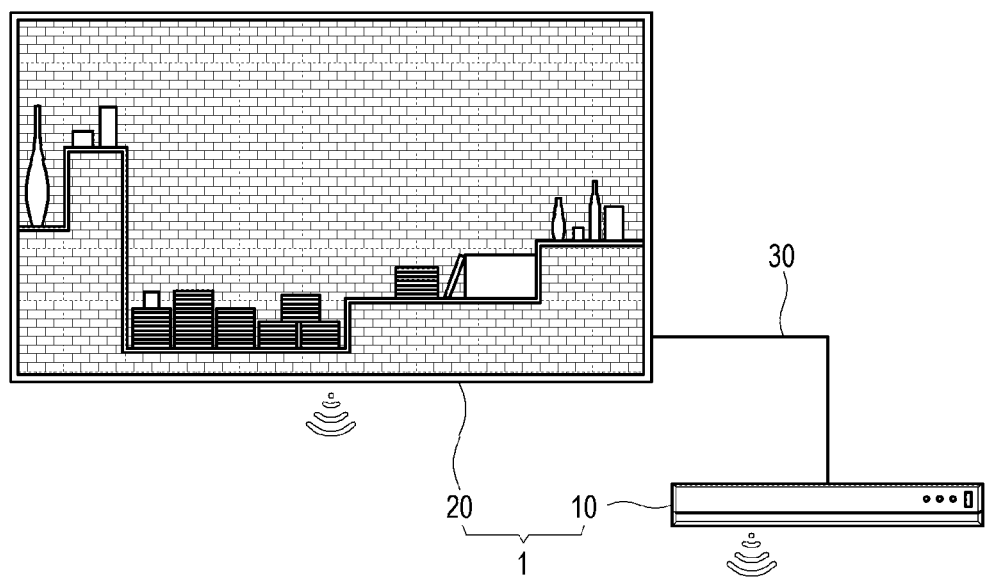
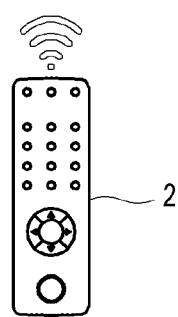

DISPLAY APPARATUS, METHOD OF CONTROLLING THE SAME AND RECORDING MEDIUM THEREOF

CROSS-REFERENCE TO RELATED APPLICATION(S)

This application is based on and claims priority under 35 U.S.C. § 119 to Korean Patent Application No. 10-2018-0110940, filed on Sep. 17, 2018, in the Korean Intellectual Property Office, the disclosure of which is incorporated by reference herein in its entirety.

BACKGROUND

1. Field

The disclosure relates to a display apparatus, a method of controlling the same, and a recording medium thereof, and more particularly to a display apparatus configured to transmit a wireless signal to a peripheral apparatus.

2. Description of Related Art

A display apparatus displays an image based on an image signal that is received from an external device or that is generated internally, and includes a display panel that displays the image and other elements.

The display apparatus may be wired or wirelessly connected to various types of peripheral devices depending on the intended function of the display apparatus.

The display apparatus may transceive wireless signals with input devices such as a remote controller. Accordingly, the display apparatus includes a transmitter to transmit the wireless signals.

The display apparatus may include multiple transmitters to overcome communication restrictions due to various installation conditions.

However, if some wireless signals are delayed during the process of outputting the wireless signals, there is a risk of interference between the wireless signals.

Thus, because of signal distortion due to the interference, the peripheral devices that receive the wireless signals may misidentify the signals, which may cause the display apparatus to malfunction.

SUMMARY

In accordance with an aspect of the disclosure, a display apparatus includes: a display configured to display an image; a first transmitter configured to transmit a first wireless signal to an external device; a second transmitter configured to transmit a second wireless signal having a same period as the first wireless signal transmitted by the first transmitter to the external device; a signal receiver configured to receive the first wireless signal and the second wireless signal; and a processor configured to identify a time difference between the signal receiver receiving the first wireless signal and the signal receiver receiving the second wireless signal, and control the first transmitter to transmit, to the external device, the first wireless signal that is compensated based on the identified time difference, or control the second transmitter to transmit, to the external device, the second wireless signal that is compensated based on the identified time difference.

The signal receiver may be further configured to receive the first wireless signal from the first transmitter and the second wireless signal transmitted from the second transmitter; and the processor may be further configured to, based on whether the first wireless signal received by the signal receiver or the second wireless signal received by the signal receiver is identified, control the first transmitter to transmit the first wireless signal that is compensated based on the identified time difference or the second transmitter to transmit the second wireless signal that is compensated based on the identified time difference.

The processor may be further configured to, based on whether decoding of the first wireless signal received by the signal receiver and the second wireless signal received by the signal receiver is successful, identify the first wireless signal received by the signal receiver and the second wireless signal received by the signal receiver.

The first transmitter may be provided in a main body of the display apparatus, and the second transmitter may be provided in the display which is connected to the main body via a cable.

The main body may include: a signal generator configured to generate a signal to be used by the first transmitter to transmit the first wireless signal or the second transmitter to transmit the second wireless signal; and a signal converter configured to convert the signal to a signal format of the cable via which the converted wireless signal is transmitted to the display.

The display may include a second signal converter configured to convert the signal received from the main body via the cable to another signal format of the second transmitter.

The display apparatus may further include a storage configured to store information associated with a reference signal, and the processor may be further configured to identify the time difference by comparing respective lengths of the first wireless signal received by the signal receiver and the second wireless signal received by the signal receiver with a length of the reference signal based on the stored information associated with the reference signal.

The processor may be further configured to control the first transmitter to transmit the first wireless signal that is compensated based on the time difference during an initialization operation of the display apparatus, or the second transmitter to transmit the second wireless signal that is compensated based on the time difference during the initialization operation of the display apparatus.

In accordance with an aspect of the disclosure, a method of controlling a display apparatus includes: transmitting, by a first transmitter of the display apparatus, a first wireless signal; transmitting, by a second transmitter of the display apparatus, a second wireless signal having a same period as the first wireless signal; receiving, by a signal receiver of the display apparatus, the first wireless signal and the second wireless signal; and controlling the first transmitter to transmit the first wireless signal that is compensated or the second transmitter to transmit the second wireless signal that is compensated, the first wireless signal or the second wireless being compensated based on a time difference between the signal receiver receiving the first wireless signal and the signal receiver receiving the second wireless signal.

The receiving may include receiving, by the signal receiver of the display apparatus, the first wireless signal transmitted from the first transmitter and the second wireless signal transmitted from the second transmitter, and the controlling may include, based on whether the received first wireless signal or the received second wireless signal is identified, controlling the first transmitter to transmit the first wireless signal that is compensated based on the time difference or the second transmitter to transmit the second wireless signal that is compensated based on the time difference.

The method may further include, based on whether decoding of the first wireless signal received by the signal receiver and the second wireless signal received by the signal receiver is successful, identifying the first wireless signal received by the signal receiver and the second wireless signal received by the signal receiver.

The first transmitter may be provided in a main body of the display apparatus, and the second transmitter may be provided in a display which is connected to the main body via a cable.

The method may further include: generating a signal to be used by the first transmitter to transmit the first wireless signal or the second transmitter to transmit the second wireless signal; and converting the wireless signal to a signal format of the cable via which the converted signal is transmitted to the display.

The method may further include converting the signal received from the main body via the cable to another signal format of the second transmitter.

The method may further include identifying the time difference by comparing lengths of the first wireless signal received by the signal receiver and the second wireless signal received by the signal receiver with a length of a reference signal.

The controlling may include controlling the first transmitter to transmit the first wireless signal that is compensated based on the time difference during an initialization operation of the display apparatus or the second transmitter to transmit the second wireless signal that is compensated based on the time difference during the initialization operation of the display apparatus.

In accordance with an aspect of the disclosure, a non-transitory computer-readable recording medium stores a computer program including instructions which are executable by an electronic apparatus to perform a method including: transmitting, by a first transmitter of the electronic apparatus, a first wireless signal; transmitting, by a second transmitter of the electronic apparatus, a second wireless signal having a same period as the first wireless signal; receiving, by a signal receiver of the electronic apparatus, the first wireless signal and the second wireless signal; and controlling the first transmitter to transmit the first wireless signal that is compensated or the second transmitter the second wireless signal that is compensated, the first wireless signal or the second wireless being compensated based on a time difference between the signal receiver receiving the first wireless signal, and the signal receiver receiving the second wireless signal.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates a display apparatus according to an embodiment.

DETAILED DESCRIPTION

Figure 2:
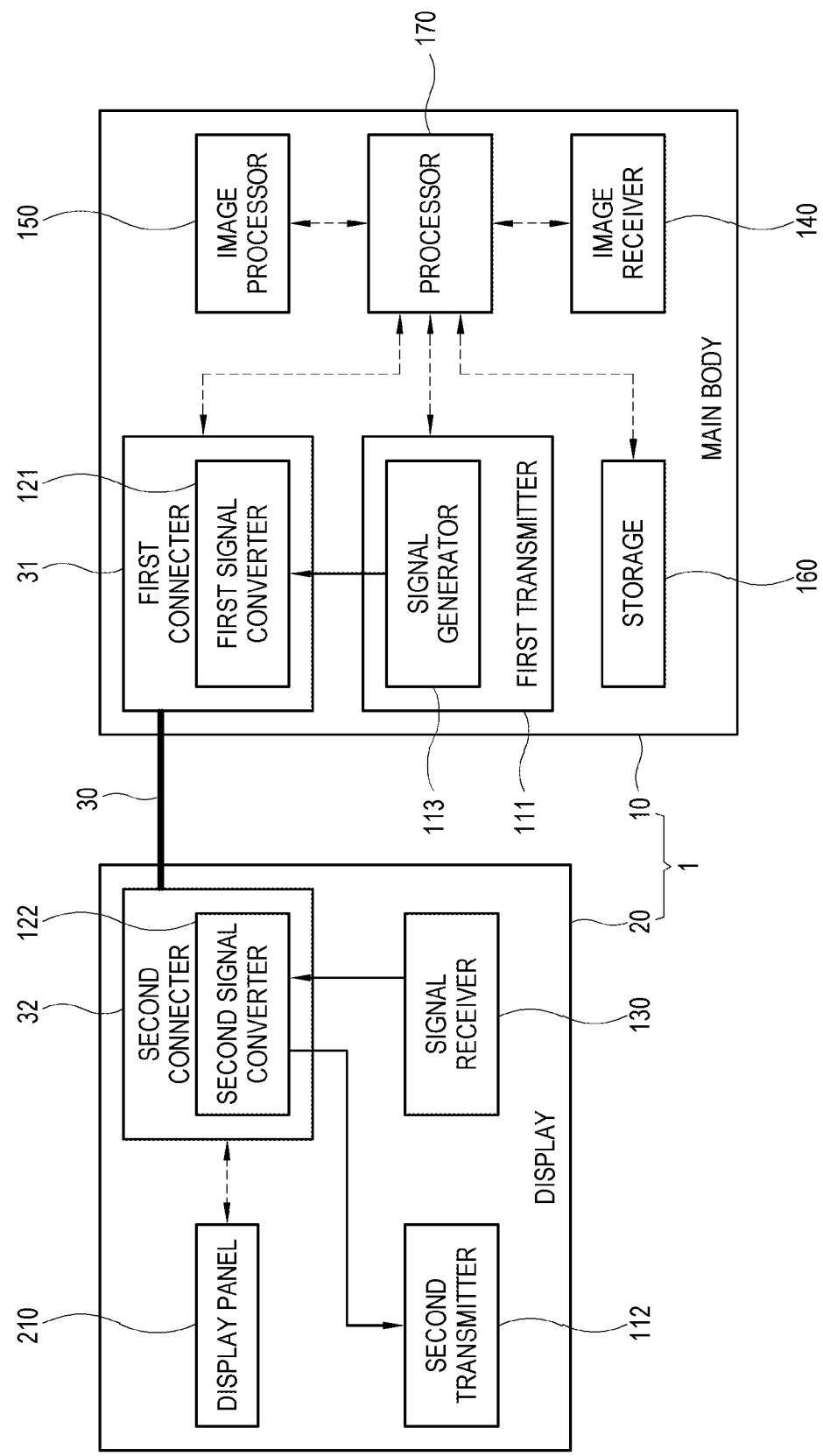
FIG. 2 is a block diagram of a display apparatus according to an embodiment.

Below, embodiments will be described in detail with reference to the accompanying drawings. In the drawings, like numerals or symbols may refer to like elements having substantially the same function, and the size of each element may be exaggerated for clarity and convenience of description. However, the configurations and functions illustrated in the following embodiments are not construed as limiting the present disclosure. In the following description, details regarding commonly known functions or features may be omitted.

In the following embodiments, terms such "first," "second," etc. may be used to distinguish one element from another, and singular forms are intended to include plural forms unless otherwise mentioned. In the following embodiments, it will be understood that terms such as "comprise," "include," "have," etc. do not preclude the presence or addition of one or more other features, numbers, steps, operation, elements, components or a combination thereof. In addition, a "module" or a "portion" may perform at least one function or operation, and may be implemented by hardware, software, or combination of hardware and software, and be integrated into at least one module. In the disclosure, at least one among a plurality of elements refers to all the plurality of elements, a single one of the plurality of elements, and/or any combination and permutation thereof.

FIG. 1 illustrates a display apparatus according to an embodiment.

As shown in FIG. 1, the display apparatus 1 according to an embodiment includes a main body 10 that outputs an image signal, and a display 20 that is spaced apart from the main body 10 and displays an image based on the image signal.

The main body 10 outputs the image signal to the display 20 to permit the display 20 to display an image of a content which is received from an external image source or is stored internally.

The main body 10 and the display 20 are connected via cable 30. The display 20 receives audio and video (AV) data such as an image signal, a sound signal, and a control signal from the main body 10 via the cable 30. Moreover, the display 20 is supplied with power from the main body 10 via the cable 30.

According to an embodiment, and as shown in FIG. 1, the main body 10 and the display 20 are connected via a single cable 30. Here, the cable 30 that connects the main body 10 and the display 20 may be embodied in a form of an optical cable that integrates a data transceiving cable and a power cable. The optical cable transceiver information via an optical fiber configured with a core and a cladding. A signal converter that performs conversion between an electric signal and an optical signal may be arranged in a transmitting connector and a receiving connector, respectively, of the optical cable.

However, the connecting method between the main body 10 and the display 20 is not limited to the foregoing embodiment, and a wired or wireless interface according to a variety of standards may be applied.

The wired interface, for example, may be a cable according to a certain standard. The wireless interface, for example, may be at least one among wireless fidelity (Wi-Fi), Wi-Fi direct, and Bluetooth.

In the display apparatus 1 according to an embodiment, the main body 10 is a media box that transmits a signal that allows the display 20 to display various content. In the display apparatus 1 according to an embodiment, because the main body 10 is an apparatus that is connected with the display 20 via the single cable 30, the main body 10 is also referred to as a one connect (CC) box.

The main body 10 receives content from a plurality of content sources, that is, a signal providing source.

In the present disclosure, the type of the content source that provides content is not limited, and for example, may include a set-top box (STB); a player for an optical disc such as a Blu-ray disc, a digital versatile disc (DVD), or the like; a personal computer (PC) such as a laptop computer or a desktop computer; a mobile device that includes smart pads such as smart phones and tablets; and the like. Moreover, the main body 10 may receive content that is provided in a file format according to live streaming via a wired or wireless network.

According to an embodiment, the display apparatus 1 is embodied as a television (TV) which displays broadcast content.

As a TV, the main body 10 of the display apparatus 1 may receive and process broadcast content based on at least one among a broadcast signal, broadcast information, or broadcast data which is received from transmission equipment of a broadcast station. The main body 10 may wirelessly receive a radio frequency (RF) signal, i.e., a broadcast signal, which is transmitted from the broadcast station. To this end, the main body 10 may include an antenna to receive the broadcast signal, and a tuner to be tuned to the broadcast signal for each individual channel.

In the display apparatus 1, the broadcast signal may be received via a ground wave, cable, satellite, or the like, and the source of the signal is not limited to a broadcasting station. A device or a station capable of transmitting and receiving data may be included in the image source of the apparatus.

According to an embodiment of the disclosure, the display apparatus may be embodied as a smart TV or an Internet Protocol TV (IPTV). The TV may receive and display broadcast signals in real time, and provide a convenient user environment with a web browsing function where the TV displays real time broadcast signals and searches various content via the Internet. The TV further includes an open software platform that may provide interactive services for users. Thus, the TV may provide users with various content such as, for example, an application providing a predetermined service via an open software platform. Such an application is an application program capable of providing various kinds of services and includes applications for providing services such as social networking services (SNS), finance services, news services, weather services, map services, music services, movie services, game services, e-book services, and the like.

A standard of the signal received by the main body 10 may be any one of various standards, and correspond to the implementation of the display apparatus. The display apparatus 1 may receive content via a wire such as high definition multimedia interface (HDMI), composite video, component video, super video, SCART, and universal serial bus (USB).

The main body 10 may receive content from various external devices via wired or wireless network communication, and the type of communication is not limited.

Specifically, the main body 10 may perform at least one of wireless communication via an access point (AP), or wireless communication via a direct connection with another device without an AP. For example, the main body 10 may receive content from content sources by wireless network communications such as Wi-Fi, Wi-Fi direct, or Bluetooth. In addition, the main body 10 may receive content via wired network communication such as Ethernet.

The display apparatus 1 according to an embodiment may perform wireless communication with peripheral devices such as a remote controller 2. The wireless communication may include infrared (IR) communication in a predetermined frequency band.

The display apparatus 1 is provided with multiple transmitters for outputting wireless signals, such as infrared (IR) signals.

Referring to FIG. 2, and according to an embodiment, the display apparatus 1 may include a first transmitter 111 provided in the main body 10, and a second transmitter 112 provided in the display 20. Mounting positions of the first transmitter 111 and the second transmitter 112 are not limited. For example, the first transmitter 111 may be installed in an area disposed near a front surface of the main body 10, and the second transmitter 112 may be disposed in an area such as, for example, a bottom of a front edge of the display 20.

In addition, the display apparatus 1 may be provided with at least one signal receiver 130 for receiving a wireless signal output from a peripheral device such as the remote controller 2 (e.g., an IR signal).

According to an embodiment, the signal receiver 130 is provided in the display 20, for example, at an area (bottom) of the front edge. In this case, the signal receiver 130 may be installed near the first transmitter 111.

However, the installed location of the signal receiver 130 is not limited, and the signal receiver 130 may be installed in the main body 10. Moreover, the display apparatus 1 may include a plurality of receivers that receive wireless signals. Thus, the display apparatus 1 may have a first signal receiver 130 in the main body 10, and a second signal receiver 130 in the display 20, respectively.

Hereinafter, a specific configuration of the display apparatus 1 according to an embodiment will be described with reference to the drawings.

Figure 3:
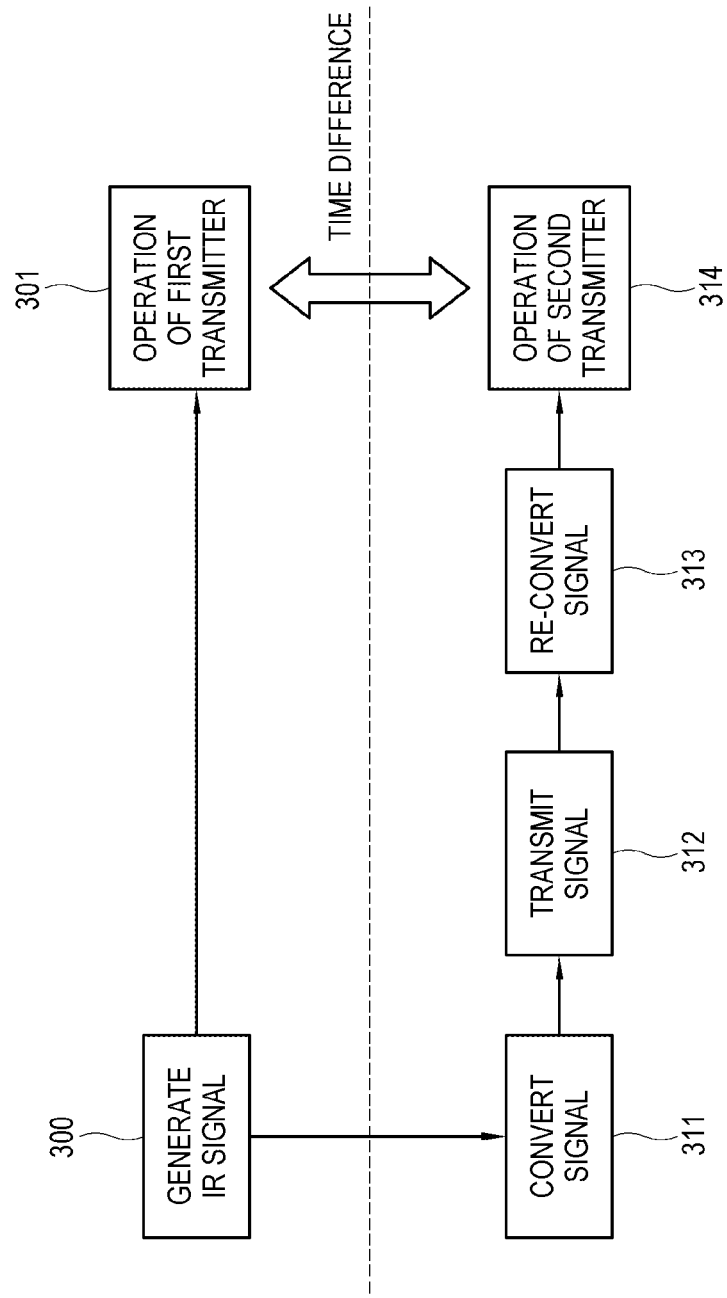
FIG. 3 illustrates a transmitting process of wireless signals of the display apparatus according to an embodiment.
Figure 4:
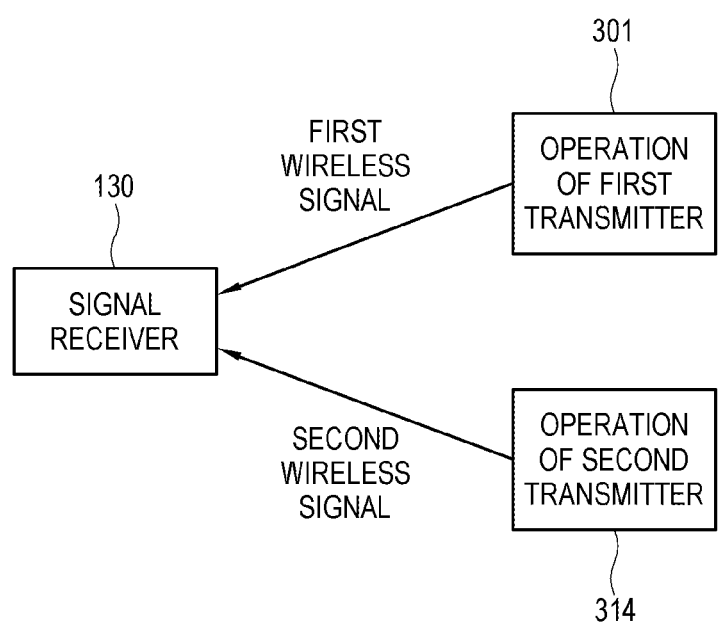
FIG. 4 illustrates another example of a transmitting process of wireless signals of the display apparatus according to an embodiment.
Figure 5:
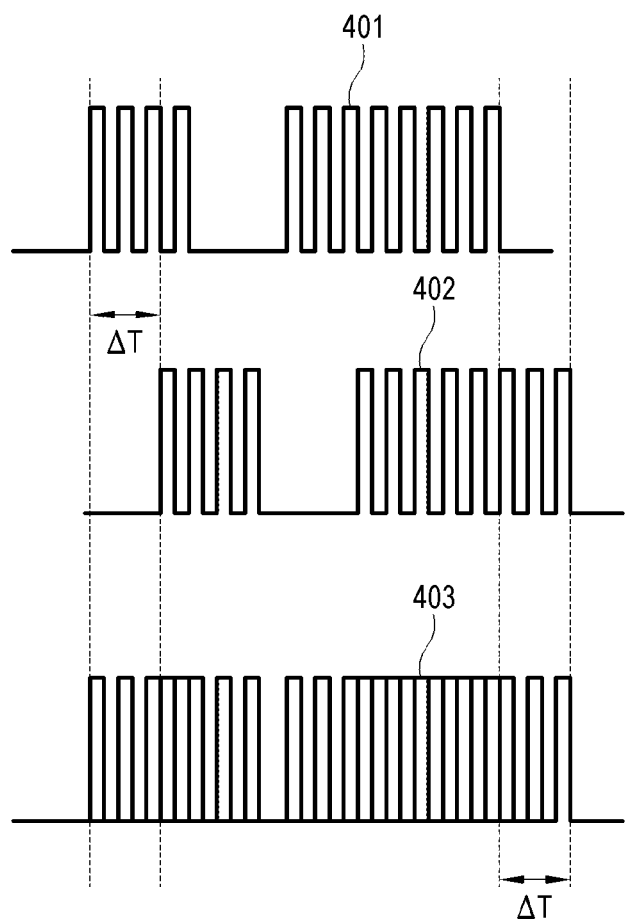
FIG. 5 illustrates a wave form of wireless signals of the display apparatus according to an embodiment.

FIG. 2 is a block diagram showing a configuration of the display apparatus according to an embodiment. FIGS. 3, 4, and 5 illustrate transmission of a wireless signal in the display apparatus according to an embodiment.

According to an embodiment, and as shown in FIG. 2, the display apparatus 1 includes a first transmitter 111 and a second transmitter 112 for outputting wireless signals, a first signal converter 121 and a second signal converter 122 for converting signals, and a signal receiver 130 for receiving wireless signals.

As described above, the wireless signals output from the first transmitter 111 and the second transmitter 112 may include IR signals. In an embodiment, the first transmitter 111 may be provided in the main body 10, and the second transmitter 112 may be provided in the display 20.

The first transmitter 111 and the second transmitter 112 may be implemented as communication circuitry including at least one electronic device capable of emitting infrared rays. In an embodiment, each of the first transmitter 111 and the second transmitter 112 may include one or more infrared light emitting diodes (hereinafter, also referred to as IR LEDs or IREDs).

In an embodiment, the first transmitter 111 may include a signal generator 113 that generates wireless signals (e.g., IR signals). The signal generator 113 may generate an IR signal that is modulated using a carrier frequency of a predetermined frequency band such as, for example, 38 kHz, 40 kHz, or 56 kHz.

Specifically, as shown in FIG. 3, the signal generator 113 of the display apparatus 1 generates an IR signal of a predetermined frequency band (300).

The generated IR signal is output (301) by the operation of the IR LED of the first transmitter 111, and is transmitted to the display 20 via the cable 30 for transmission of the second transmitter 112.

The first signal converter 121 converts the IR signal to correspond to a signal transmission format of the cable 30 so that the converted signal is transmitted to the display 20 via the cable 30 (311).

In an embodiment, the cable 30 is implemented as an optical cable, and the first signal converter 121 converts the IR signal generated by the signal generator 113 into an optical signal.

The first signal converter 121 may be provided in the first connecter 31 on a side of the main body 10, and the first connecter 31 may be connected to an end of the cable 30 as shown in FIG. 2. However, this is merely an example, and the first signal converter 121 and the first connecter 31 may be provided at different positions that permit the first signal converter 121 and the first connecter 31 to interface with each other. The first connecter 31 and the second connecter 32, which are described in more detail elsewhere herein, include connection terminals.

The signal converted by the first signal converter 121 is transmitted to the display 20 via the first connecter 31, the cable 30, and the second connecter 32, sequentially (312).

The second signal converter 122 re-converts the signal received via the second connecter 32 to be transmitted by the second transmitter 112 (313).

In an embodiment, the cable 30 is implemented as an optical cable, and the second signal converter 122 converts the received optical signal into an electric signal such as an IR signal for the second transmitter 112.

The second signal converter 122 may be provided in the second connecter 32 near a side of the display 20, and the second connecter 32 may be connected to an end of the cable 30 as shown in FIG. 2. However, this is merely an example, and the second signal converter 122 and the second connecter 32 may be provided at different positions that permit the second signal converter 122 and the second connecter 32 to interface with each other.

The second transmitter 112 transmits a wireless signal based on the signal converted by the second signal converter 122 by the operation of the IR LED of the second transmitter 112 (314).

Hereinafter, a wireless signal transmitted by the first transmitter 111 is referred to as a first wireless signal, and a wireless signal transmitted by the second transmitter 112 is referred to as a second wireless signal. The first wireless signal and the second wireless signal correspond to each other and include the same length (hereinafter also referred to as "period" or "unit length") and waveform, but include a different path.

The signal receiver 130 receives wireless signals such as IR signal.

The signal receiver 130 may be implemented as a communication circuitry composed of at least one electronic device for detecting an infrared ray of a predetermined wavelength. In an embodiment, the signal receiver 130 includes an IR photodiode.

Although the signal receiver 130 is provided in the display 20 in an embodiment, the disclosure is not limited to this configuration, and the signal receiver 130 may be provided in the main body 10.

In an embodiment, the wireless signal received by the signal receiver 130 may be a signal transmitted from a peripheral device (e.g., an external device) such as the remote controller 2, and may also include the first wireless signal and the second wireless signal transmitted from the first transmitter 111 and the second transmitter 112, respectively, as shown in FIG. 4. That is, the signal receiver 130 may receive the first wireless signal, the second wireless signal, or a mixed signal that is a combination of the first wireless signal and the second wireless signal as a feedback signal or a reflection signal.

In the display apparatus 1 according to an embodiment, the second wireless signal 402 output from the second transmitter 112 is converted by the first signal converter 121 and the second signal converter 122, and is transmitted via the cable 30. In this way, the second wireless signal 402 may be delayed by a time difference ΔT compared to the first wireless signal 401 that is output from the first transmitter 111 as shown in FIG. 5.

Accordingly, the first wireless signal 401 and the second wireless signal 402 may be received with the time difference ΔT. In other words, the time difference ΔT between the first wireless signal 401 and the second wireless signal 402 may occur at a receiver.

As described above, although the first wireless signal 401 and the second wireless signal 402 are converted and transmitted in different paths to the first transmitter 111 and the second transmitter 112, the first wireless signal 401 and the second wireless signal 402 have the same length and waveform.

Thus, as shown in FIG. 5, the second wireless signal 402 is delayed from the first wireless signal 401, where a receiver receives a wireless signal 403 in a distorted form due to interference between the two signals 401 and 402. In other words, the received wireless signal 403 has a form that is lengthened by the time difference ΔT as compared to the original signals 401 or 402, which are originally output, as shown in FIG. 5.

If the distorted wireless signal 403 as described above is received, the received wireless signal 403 might not be normally identified as the first wireless signal 401 or the second wireless signal 402, thereby causing a malfunction in the display apparatus 1. Here, the first wireless signal 401 or the second wireless signal 402 is successfully identified based on whether or not the signal 401 or 402 may be decoded. That is, in the case of a distorted wireless signal, if the signal is not decoded, the signal might not be successfully identified, so that the operation corresponding to the command included in the signal might not be normally performed.

On the other hand, if the received wireless signal is decoded, the display apparatus 1 may successfully identify the signal and may normally perform the operation corresponding to the command included in the signal.

Meanwhile, in an embodiment, the signal generator 113 for generating a wireless signal is provided in the main body 10, but the disclosure is not limited thereto.

In other words, the signal generator 113 may be provided in the display 20. In this case, the wireless signal generated to be output by the second transmitter 112 is transmitted to the main body 10 via the cable 30, and is output by the first transmitter 111. In another embodiment as described above, by the signal conversion and transmission process, the first wireless signal and the second wireless signal may be output with the time difference ΔT, and a malfunction of the display apparatus 1 may occur due to interference between the two signals.

The display apparatus 1 according to an embodiment controls the first transmitter 111 or the second transmitter 112 to transmit the first wireless signal or the second wireless signal to be compensated based on the time difference ΔT between the receiving of the first wireless signal and the receiving of the second wireless signal in the receiver 130.

Here, the display apparatus 1 may output test signals as the first wireless signal and the second wireless signal from the first transmitter 111 and the second transmitter, respectively, during an initialization process. The output first wireless signal and the output second wireless signal are received by the signal receiver 130 as a feedback signal.

The specific operation of a time difference compensation will be described in detail with reference to FIG. 6.

As shown in FIG. 2, the display apparatus 1 according to an embodiment includes an image receiver 140, an image processor 150, a storage 160, and a processor 170 provided in the main body 10. In addition, the display apparatus 1 includes a display panel 210 provided on the display 20.

The configuration included in the display apparatus 1 is not limited to the above embodiment, and may be configured to include or exclude at least one component, or may include another component.

For example, the display apparatus 1 may include various external devices such as video sources, servers, etc., a communication interface including a communication module such as Wi-Fi or Bluetooth module configured to perform wired or wireless network communication, and/or a user input interface including an operation panel on which a user input may be received. In the disclosure, the remote controller 2 for receiving a wireless signal is included in the user input interface. The communication interface may be implemented as a communication circuitry including a wireless communication module (e.g., a software module, a chip, etc.) corresponding to various types of communication protocols.

The image receiver 140 is configured to receive content from the image source. The image receiver 140 includes a tuner for tuning a broadcast signal for each channel.

The image receiver 140 includes a connecter for allowing the main body 10 to be wired to an external image source. The display apparatus 1 may receive content from an image source such as a set-top box via the connecter connected with wire.

The connecter may be implemented as a communication circuitry including a data input/output interface in which a communication module (e.g., a software module, a chip, etc.) and a port corresponding to various types of communication protocols are provided.

The connecter may receive a signal from an image source, and transmit and receive signals in both directions.

In an embodiment, the connecter is connected to an image source via an HDMI cable, but the connection method is not limited to HDMI. In addition, the display apparatus 1 and the image source may be wirelessly connected by a communication interface including a wireless communication module such as a Wi-Fi module, and/or the like.

In an embodiment, a device that is wired to the display apparatus 1 via the connecter may be an image source such as a set-top box, an optical disc player, or a PC, but the disclosure is not limited thereto. For example, in another embodiment, the display apparatus 1 may be wired to a mobile device via the connecter.

The image processor 150 is configured to perform image processing of the image signal of the content. The image processor 120 outputs an image signal generated by performing the image processing process to the display 20 so that the image corresponding to the image signal is displayed on the display panel 210. The image signal processed by the image processor 150 may be based on data stored in a non-volatile storage 160 such as a flash memory, a hard disk, or the like.

The image processor 150 includes a decoder for decoding the image signal corresponding to an image format and a scaler for adjusting the image signal according to an output specification of the display panel 210. In an embodiment, the decoder may be implemented as, for example, a Moving Picture Experts Group (MPEG) decoder, but the type of the decoder in the disclosure is not limited. For example, the content processed by the image processor 150 may include moving pictures such as video and/or pictures such as photographs and background pictures in a form of a file.

The type of the image processing process performed by the image processor 150 is not limited. For example, at least one of de-interlacing for converting an interlaced broadcast signal into a progressive mode, detail enhancement, frame refresh rate conversion, line scanning, and the like may be performed.

The image processor 150 may be embodied as a group of individual components configured to independently perform each of the foregoing processes, or as an integrated component included in a main system-on-chip (SoC) in which various functions are integrated. The main SoC may further include at least one microprocessor or CPU, which is an example of implementing the processor 170 described below.

In an embodiment, the image processor 150 may be implemented as an image board on which a circuit configuration of various chipsets, memories, electronic components, wiring, and the like, for performing each processes is mounted on a printed circuit board (PCB). In this case, the display apparatus 1 may be provided with an image processor 150 and a processor 170 on a single video board. Alternatively, the image processor 150 and the processor 170 may be disposed on a plurality of PCBs communicably connected to each other.

The storage 160 is configured to store various data of the display apparatus 1. The storage 160 may be provided as a writable read-only memory (ROM) in which data is configured to persist even if the power supplied to the display apparatus 1 is turned off, and the data change may be reflected. That is, the storage 160 may include at least one of a flash memory, a hard disk (HDD), an erasable programmable read-only memory (EPROM), an electrically erasable programmable read-only memory (EEPROM), or the like. The storage 160 may further include volatile memory such as a dynamic random access memory (DRAM) or a static random access memory (SRAM) whose reading or writing speed of the display apparatus 1 is higher than that of the nonvolatile memory.

The data stored in the storage 160 includes, for example, programs, applications, image data, additional data, an operating system for operating a computer, and the like.

The storage 160 may store graphic data as additional data. The graphic data is output to the display 20 as an image signal processed by the image processor 150 and displayed in an area of the screen constituting the display panel 210 as a graphic of an on-screen display (OSD), a graphic user interface, and the like.

In an embodiment, the storage 160 is configured to store information of a predefined wireless signal (reference signal) to be output from the first transmitter 111 and the second transmitter 112. The reference signal is a form of a test signal to be output during an initialization process of the display apparatus 1 and includes a predefined length and waveform.

However, in the disclosure, the test signal is not transmitted only during the initialization process. In another embodiment, the display apparatus 1 may be configured to transmit a test signal based on detecting a malfunction, based on receiving a user input, or according to a predetermined period.

The display apparatus 1 may compare the received wireless signal with the reference signal stored in the storage 160 to obtain information associated with a time difference ($\Delta T$) between the receiving of the first wireless signal and the receiving of the second wireless signal.

The processor 170 is configured to perform control for operating components of the display apparatus 1. The processor 170 executes a control program (or an instruction) that enables the control operation to be performed. The processor 170 loads at least a portion of the control program from the non-volatile memory in which the control program is installed into the volatile memory, and includes at least one general purpose processor for executing the loaded control program, and configured as, for example, a central processing unit (CPU), an application processor (AP), or a microprocessor.

The processor may include a single core, a dual core, a triple core, a quad core, and multiples thereof. Multiple processors may be provided such as, for example, a main processor and a sub processor operating in a sleep mode (for example, only standby power is supplied) may be included. In addition, the processor, ROM, and RAM may be interconnected via an internal bus, and ROM and RAM are included in the storage 160.

In the disclosure, the processor 170 may be embodied as being included in a main SoC mounted on a PCB provided in the display apparatus 1. In another embodiment, the main SoC may further include the image processor 150.

The control program may include program(s) implemented in the form of at least one of a basic input/output system (BIOS), a device driver, an operating system, firmware, a platform, and an application. In an embodiment, the application program may be installed or stored in the apparatus 1 at the time of manufacturing the display apparatus 1, or may be installed in the display apparatus 1 based on the data of the application program being received from an external device at the time of later use. The data of the application program may be downloaded to the display apparatus 1 from an external server such as, for example, an application market. Such an external server is an example of the computer program product of the disclosure, but is not limited thereto.

In an embodiment, the operation of the processor 170 may be implemented by a computer program stored in a computer program product provided separately from the display apparatus. In this case, the computer program product includes a memory in which instructions corresponding to the computer program are stored, and a processor. The instruction(s), when executed by the processor, cause the processor to control the first transmitter 111 or the second transmitter 112 so that any one of the first wireless signal and the second wireless signal is compensated for by the generated time difference based on the time difference generated by the first wireless signal and the second wireless signal receiver 130.

Accordingly, the display apparatus 1 may download and execute a computer program stored in a separate computer program product to perform the operation of the processor 170.

The display panel 210 displays an image based on the image signal processed by the image processor 150.

In the disclosure, the implementation of the display 20 having the display panel 210 is not limited and may include, for example, liquid crystals, plasma, light-emitting diodes (LEDs), organic light-emitting diodes (OLEDs), surface-conduction electron-emitters, carbon nano-tubes, nano-crystals, and the like.

The display 20 may further include an additional component (for example, a driver) in addition to the display panel 210 for displaying an image according to the implementation method.

The driver may be implemented with one or more driver integrated circuits (ICs) that permit the output an electric signal for driving an electronic element or the like constituting the light source or the screen to display an image on the display panel 210 based on the image signal received from the image processor 150.

Hereinafter, with reference to the drawings, an embodiment in which the display apparatus 1 compensates for a time difference of a wireless signal and displays content according to the time difference will be described.

Figure 6:
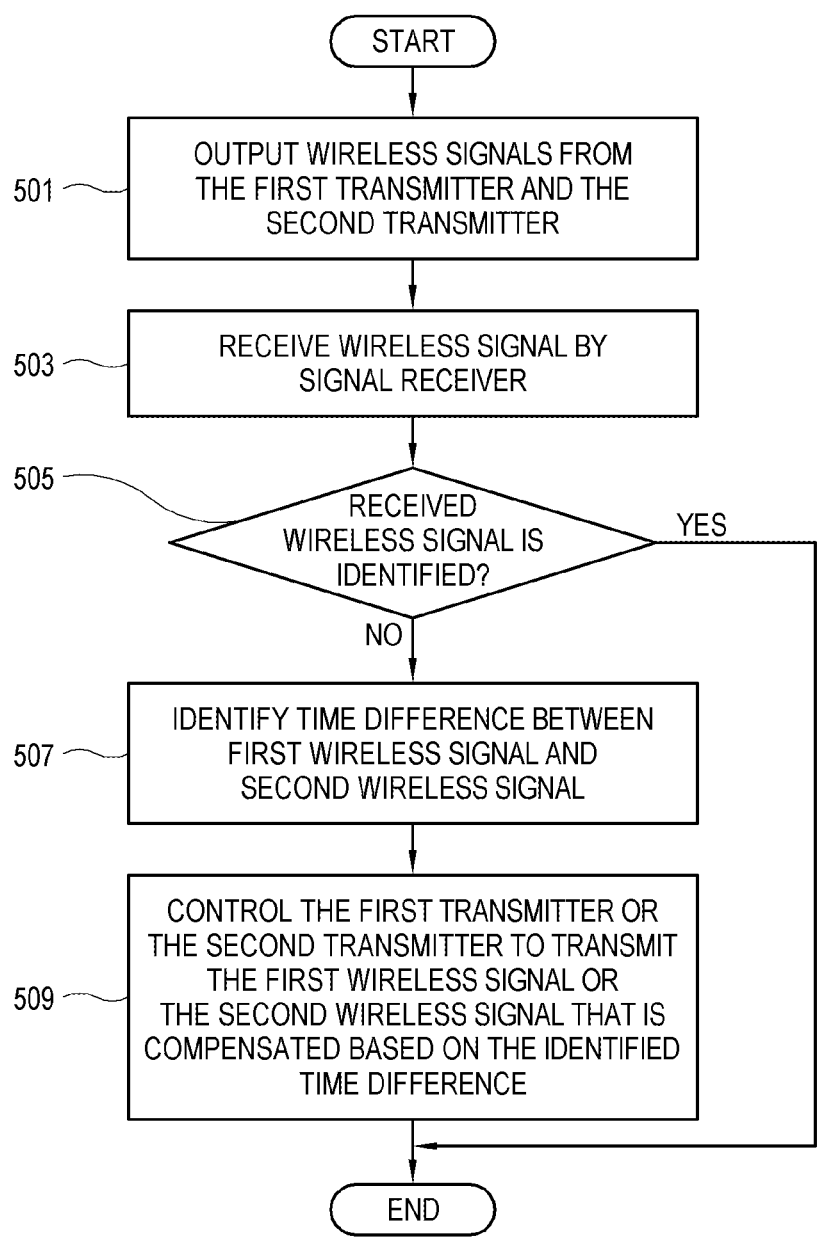
FIG. 6 is a flowchart showing the control method of the display apparatus according to an embodiment.

FIG. 6 is a flowchart illustrating a method of controlling a display apparatus according to an embodiment.

As shown in FIG. 6, the display apparatus 1 outputs wireless signals from the first transmitter 111 and the second transmitter 112 (step 501). The processor 170 controls the signal generator 113 to generate the wireless signals as test signals during an initialization process, and the generated wireless signals are output as the first wireless signal 401 from the first transmitter 111, and as the second wireless signal 402 from the second transmitter 112, respectively. Here, the signal generator 113 generates the wireless signals to include a length and a waveform corresponding to the reference signal stored in the storage 160. Further, the signal generator 113 generates the first wireless signal 401 and the second wireless signal 402 may include the same period.

In step 501, and according to an embodiment of the display apparatus 1 in which the main body 10 and the display 20 are separated, the second wireless signal 402 that is output from the second transmitter 112 provided in the display 20 may be output with a delay of a time difference $\Delta T$ as compared to the first wireless signal 401 output from the first transmitter 111 provided in the main body 10.

The signal receiver 130 receives a wireless signal 403 (step 503). The signal receiver 130 may receive the first wireless signal 401 and/or the second wireless 402 signal output as a feedback signal.

The processor 170 determines whether the wireless signal 403 received at step 503 is successfully identified as the first wireless signal 401 or the second wireless signal 402 (step 505). The processor 170 determines whether the wireless signal 403 is successfully identified based on a success or a failure of decoding of the received wireless signal 403. In other words, if the received wireless signal 403 is not decoded, the processor 170 determines that the wireless signal 403 is not successfully identified.

If it is determined in step 505 that the received wireless signal 403 is not successfully identified (step 505—NO), then the processor 170 identifies a time difference $\Delta T$ between the first wireless signal 401 output from the first transmitter 111 and the second wireless signal 402 output from the second transmitter 112 (step 507).

Specifically, the wireless signal 403 received in step 503 has a form that is lengthened by the time difference ΔT as compared with the first wireless signal 401 or the second wireless signal 402, as shown in FIG. 5. The processor 170 compares a length of the received wireless signal 403 with a length of the reference signal stored in the storage 160 and may identify the time difference ΔT between the first wireless signal 401 and the second wireless signal 402 based on the comparison result.

The processor 170 controls the first transmitter 111 or the second transmitter 112 to transmit the first wireless signal or the second wireless signal that is compensated based on the identified time difference ΔT (step 509). The processor 170 may, in a predefined manner, control one of the first and second transmitters 111 and 112 to compensate for the time difference ΔT.

Specifically, the processor 170 sets a transmission timing of the wireless signal 401 or 402 to be delayed by the identified time difference (ΔT) in the first transmitter 111 or the second transmitter 112.

For example, as shown in FIG. 5, if it is identified that the second wireless signal 402 output from the second transmitter 112 is delayed as compared to the first wireless signal 401 output from the first transmitter 111, then the processor 170 controls the first transmitter 111 to delay the transmission timing of the first wireless signal 401 output from the first transmitter 111 by the time difference ΔT.

Accordingly, in the operation process of the display apparatus 1, the first transmitter 111 and the second transmitter 112 simultaneously output the first wireless signal 401 and the second wireless signal 402, respectively. In this way, the first wireless signal 402 and the second wireless signal 402 may be simultaneously received at the receiving side (for example, by the remote controller 2), thereby reducing interference or distortion between the two signals 401 and 402, and reducing the likelihood of the display apparatus 1 malfunctioning.

If it is determined in step 505 that the received wireless signal 403 is successfully identified (step 505—YES), then the display apparatus 1 may decode the wireless signal 403 and operate normally according to the command included in the signal. Accordingly, the display apparatus 1 might not perform a compensation operation in this case.

In an embodiment, the processor 170 may retry the operation from step 501 after the compensation of step 509 is performed. Accordingly, if the wireless signal 403 is normally identified at step 505, the compensation operation is completed.

Although a few embodiments have been shown and described, it will be appreciated by those skilled in the art that changes may be made to these embodiments without departing from the principles and spirit of the disclosure, the scope of which is defined in the appended claims and their equivalents.

What is claimed is:

1. A display apparatus comprising:
   a display configured to display an image;
   a first transmitter configured to transmit a first wireless signal to an external device;
   a second transmitter configured to transmit a second wireless signal having a same period as the first wireless signal transmitted by the first transmitter to the external device;
   a signal receiver configured to receive the first wireless signal and the second wireless signal; and
   a processor configured to:
      identify a time difference between the signal receiver receiving the first wireless signal and the signal receiver receiving the second wireless signal, and
      control the first transmitter to transmit, to the external device, the first wireless signal that is compensated based on the identified time difference, or control the second transmitter to transmit, to the external device, the second wireless signal that is compensated based on the identified time difference.

2. The display apparatus according to claim 1, wherein the signal receiver is further configured to receive the first wireless signal from the first transmitter and the second wireless signal transmitted from the second transmitter; and
   the processor is further configured to, based on whether the first wireless signal received by the signal receiver or the second wireless signal received by the signal receiver is identified, control the first transmitter to transmit the first wireless signal that is compensated based on the identified time difference or the second transmitter to transmit the second wireless signal that is compensated based on the identified time difference.

3. The display apparatus according to claim 2, wherein the processor is further configured to, based on whether decoding of the first wireless signal received by the signal receiver and the second wireless signal received by the signal receiver is successful, identify the first wireless signal received by the signal receiver and the second wireless signal received by the signal receiver.

4. The display apparatus according to claim 1, wherein the first transmitter is provided in a main body of the display apparatus, and the second transmitter is provided in the display which is connected to the main body via a cable.

5. The display apparatus according to claim 4, wherein the main body comprises:
   a signal generator configured to generate a signal to be used by the first transmitter to transmit the first wireless signal or the second transmitter to transmit the second wireless signal; and
   a signal converter configured to convert the signal to a signal format of the cable via which the converted wireless signal is transmitted to the display.

6. The display apparatus according to claim 5, wherein the display comprises a second signal converter configured to convert the signal received from the main body via the cable to another signal format of the second transmitter.

7. The display apparatus according to claim 1, further comprising a storage configured to store information associated with a reference signal,
   wherein the processor is further configured to identify the time difference by comparing respective lengths of the first wireless signal received by the signal receiver and the second wireless signal received by the signal receiver with a length of the reference signal based on the stored information associated with the reference signal.

8. The display apparatus according to claim 1, wherein the processor is further configured to control the first transmitter to transmit the first wireless signal that is compensated based on the time difference during an initialization operation of the display apparatus, or the second transmitter to transmit the second wireless signal that is compensated based on the time difference during the initialization operation of the display apparatus.

9. A method of controlling a display apparatus, the method comprising:
   transmitting, by a first transmitter of the display apparatus, a first wireless signal;
   transmitting, by a second transmitter of the display apparatus, a second wireless signal having a same period as the first wireless signal;
   receiving, by a signal receiver of the display apparatus, the first wireless signal and the second wireless signal; and
   controlling the first transmitter to transmit the first wireless signal that is compensated or the second transmitter to transmit the second wireless signal that is compensated, the first wireless signal or the second wireless being compensated based on a time difference between the signal receiver receiving the first wireless signal and the signal receiver receiving the second wireless signal.

10. The method according to claim 9, wherein the receiving comprises receiving, by the signal receiver of the display apparatus, the first wireless signal transmitted from the first transmitter and the second wireless signal transmitted from the second transmitter, and
   wherein the controlling comprises, based on whether the received first wireless signal or the received second wireless signal is identified, controlling the first transmitter to transmit the first wireless signal that is compensated based on the time difference or the second transmitter to transmit the second wireless signal that is compensated based on the time difference.

11. The method according to claim 10, further comprising, based on whether decoding of the first wireless signal received by the signal receiver and the second wireless signal received by the signal receiver is successful, identifying the first wireless signal received by the signal receiver and the second wireless signal received by the signal receiver.

12. The method according to claim 9, wherein the first transmitter is provided in a main body of the display apparatus, and the second transmitter is provided in a display which is connected to the main body via a cable.

13. The method according to claim 12, further comprising:
   generating a signal to be used by the first transmitter to transmit the first wireless signal or the second transmitter to transmit the second wireless signal; and
   converting the wireless signal to a signal format of the cable via which the converted signal is transmitted to the display.

14. The method according to claim 13, further comprising converting the signal received from the main body via the cable to another signal format of the second transmitter.

15. The method according to claim 9, further comprising identifying the time difference by comparing lengths of the first wireless signal received by the signal receiver and the second wireless signal received by the signal receiver with a length of a reference signal.

16. The method according to claim 9, wherein the controlling comprises controlling the first transmitter to transmit the first wireless signal that is compensated based on the time difference during an initialization operation of the display apparatus or the second transmitter to transmit the second wireless signal that is compensated based on the time difference during the initialization operation of the display apparatus.

17. A non-transitory computer-readable recording medium storing a computer program including instructions which are executable by an electronic apparatus to perform a method, the method comprising:
   transmitting, by a first transmitter of the electronic apparatus, a first wireless signal;
   transmitting, by a second transmitter of the electronic apparatus, a second wireless signal having a same period as the first wireless signal;
   receiving, by a signal receiver of the electronic apparatus, the first wireless signal and the second wireless signal; and
   controlling the first transmitter to transmit the first wireless signal that is compensated or the second transmitter the second wireless signal that is compensated, the first wireless signal or the second wireless being compensated based on a time difference between the signal receiver receiving the first wireless signal, and the signal receiver receiving the second wireless signal.

18. The display apparatus according to claim 1, wherein the processor is configured to control the first transmitter to transmit the first wireless signal that is compensated based on the identified time difference or the second transmitter to transmit the second wireless signal that is compensated based on the identified time difference, so that the first wireless signal and the second wireless signal are simultaneously received by the external device.

19. The method according to claim 9, wherein the controlling comprises controlling the first transmitter to transmit the first wireless signal that is compensated based on the time difference or the second transmitter to transmit the second wireless signal that is compensated based on the time difference, so that the first wireless signal and the second wireless signal are simultaneously received by an external device.

20. The non-transitory computer-readable recording medium according to claim 17, wherein the controlling comprises controlling the first transmitter to transmit the first wireless signal that is compensated based on the time difference or the second transmitter to transmit the second wireless signal that is compensated based on the time difference, so that the first wireless signal and the second wireless signal are simultaneously received by an external device.

* * * * *